（12） United States Patent
Chou et al.

(10) Patent No.: US 11,748,850 B2
(45) Date of Patent: Sep. 5, 2023

(54) BLENDED NEURAL NETWORK FOR SUPER-RESOLUTION IMAGE PROCESSING

(71) Applicant: Apple Inc., Cupertino, CA (US)

(72) Inventors: Jim Chen Chou, San Jose, CA (US); Chenge Li, New York, NY (US); Yun Gong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/721,988

(22) Filed: Apr. 15, 2022

(65) Prior Publication Data

US 2022/0270208 A1 Aug. 25, 2022

Related U.S. Application Data

(63) Continuation of application No. 16/844,951, filed on Apr. 9, 2020, now Pat. No. 11,308,582, which is a continuation of application No. 16/056,346, filed on Aug. 6, 2018, now Pat. No. 10,621,697.

(51) Int. Cl.
*G06T 3/40* (2006.01)
*G06T 5/50* (2006.01)
*G06N 3/045* (2023.01)

(52) U.S. Cl.
CPC .......... *G06T 3/4053* (2013.01); *G06N 3/045* (2023.01); *G06T 3/4007* (2013.01); *G06T 5/50* (2013.01)

(58) Field of Classification Search
None
See application file for complete search history.

(56) References Cited

U.S. PATENT DOCUMENTS

| | | |
|---|---|---|
| 2004/0047492 A1 | 3/2004 | Muise et al. |
| 2011/0026836 A1 | 2/2011 | Ptucha et al. |
| 2013/0322753 A1 | 12/2013 | Lim et al. |
| 2017/0024855 A1 | 1/2017 | Liang et al. |

(Continued)

OTHER PUBLICATIONS

Dong, C. et al. "Image super-resolution using deep convolutional networks," IEEE transactions on pattern analysis and machine intelligence, 2016, vol. 38, No. 2, 14 pages.

(Continued)

*Primary Examiner* — Suhail Khan
(74) *Attorney, Agent, or Firm* — Sterne, Kessler, Goldstein & Fox P.L.L.C.

(57) ABSTRACT

Embodiments relate to a super-resolution engine that converts a lower resolution input image into a higher resolution output image. The super-resolution engine includes a directional scaler, an enhancement processor, a feature detection processor, a blending logic circuit, and a neural network. The directional scaler generates directionally scaled image data by upscaling the input image. The enhancement processor generates enhanced image data by applying an example-based enhancement, a peaking filter, or some other type of non-neural network image processing scheme to the directionally scaled image data. The feature detection processor determines features indicating properties of portions of the directionally scaled image data. The neural network generates residual values defining differences between a target result of the super-resolution enhancement and the directionally scaled image data. The blending logic circuit blends the enhanced image data with the residual values according to the features.

17 Claims, 7 Drawing Sheets

(56) References Cited

U.S. PATENT DOCUMENTS

2017/0256033 A1* 9/2017 Tuzel .................. H04N 19/136
2018/0255290 A1    9/2018 Holzer et al.
2019/0004533 A1    1/2019 Huang et al.

OTHER PUBLICATIONS

Hacohen, Y. et al., "Image Upsampling via Texture Hallucination," IEEE International Conference on Computational Photography, 2010, pp. 1-8.
United States Office Action, U.S. Appl. No. 16/844,951, filed Sep. 29, 2021, 14 pages.
United States Office Action, U.S. Appl. No. 16/844,951, filed Jun. 16, 2021, 14 pages.

* cited by examiner

BLENDED NEURAL NETWORK FOR SUPER-RESOLUTION IMAGE PROCESSING

CROSS REFERENCE TO RELATED APPLICATION

This application is a continuation of U.S. application Ser. No. 16/844,951, filed on Apr. 9, 2020 which is a continuation of U.S. application Ser. No. 16/056,346, filed Aug. 6, 2018, now U.S. Pat. No. 10,621,697, issued on Apr. 14, 2020, all of which are hereby incorporated by reference in their entirety.

BACKGROUND

The present disclosure relates to image data processing, and more particularly, to conversion from of image data from lower resolution to higher resolution.

An image at a lower resolution can be programmatically converted into a higher resolution image using super-resolution enhancement. The speed and quality of the conversion to the higher resolution can vary depending on the type of processing that is applied to the low resolution image. For example, jagged artifacts or other errors can appear when the lower resolution images are converted to higher resolution images, while performing operations to remove such artifacts or errors may increase the time for processing the low resolution images.

SUMMARY

Embodiments relate to enhancing lower resolution input image data, such as by generating higher resolution output image data from the input image data. In some embodiments, an electronic device includes an enhancement processor, a neural network, a feature detection processor, and a blending logic circuit. The enhancement processor receives an image derived from an input image and processes the image using a non-neural network image processing scheme to generate first enhanced image data. For example, the non-neural network image processing scheme may include a peaking filter, or a block that may enhance images based on, for example, additional examples. The neural network processes the image to generate second enhanced image data. The feature detection processor analyzes the input image to obtain features indicating one or more properties of a portion of the input image relative to other portions of the input image data. The blending logic circuit has a first input terminal that receives the first enhanced image data, and a second input terminal that receives the second enhanced image data. The blending logic circuit generates an output image by at least blending a part of the first enhanced image data corresponding to the portion of the input image with a part of the second enhanced image data corresponding to the portion of the input image according to the one or more properties of the portion of the input image. The portion of the input image may be particular a region of interest of the input image, or the entire input image. In some embodiments, the first enhanced image data may be a scaled or enhanced version of the input image generated using tunable linear and nonlinear filters, and the second enhanced image data may be a scaled or enhanced version of the input image generated using linear and/or nonlinear filters derived from training (e.g., of the neural network).

In some embodiments, the electronic device further includes a scaler configured to receive the input image and generate the image that is processed by the neural network and enhancement processor as a directionally scaled version of the input image. In other embodiments, the input image is not scaled and the first and second enhanced image data are generated using the input image rather than the scaled image.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments discussed herein generate output image data by combining first enhanced image data generated from various types of non-neural network based super-resolution enhancement with second enhanced image data from a neural network. In particular, the second enhanced image data for pixels are blended with the first enhanced image data of corresponding pixel values according to texture statistics defining properties of the directionally scaled image data. The selective blending of the enhanced image data with the residual values from the neural network overcome various drawbacks of applying neural networks to super-resolution enhancement.

The super-resolution enhancement described herein refers to increasing the resolution of an input image.

The enhanced image data described herein refers to image data obtained by process of enhancing image quality. The enhanced image data may include pixel values of enhanced image or residuals of the enhanced image or a combination thereof.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
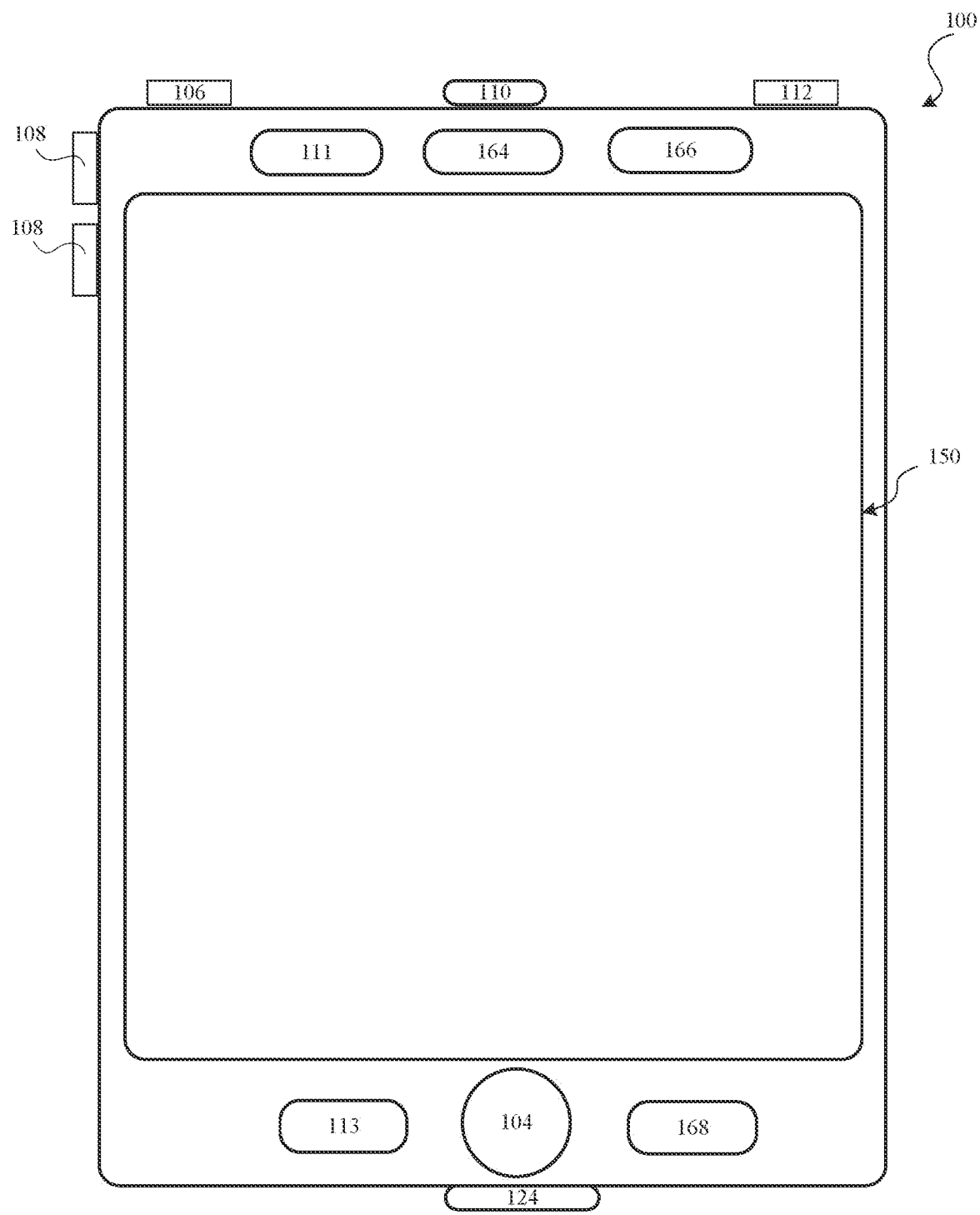
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
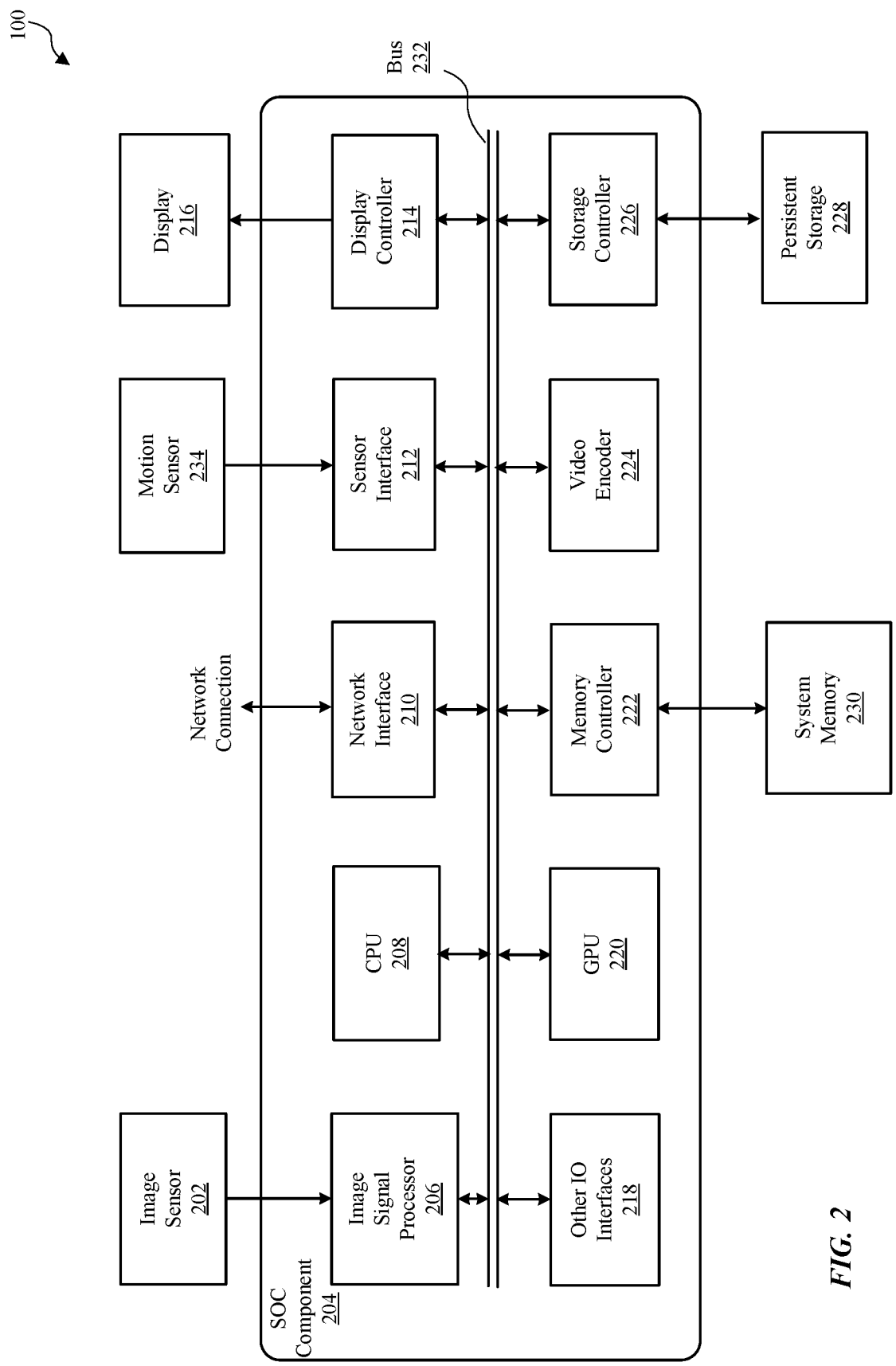
FIG. 2 is a block diagram illustrating components in the electronic device, according to one embodiment.

FIG. 2 is a block diagram illustrating components in device 100, according to one embodiment. Device 100 may perform various operations including resolution enhancement. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages. The image data may then be returned to system memory 230 or be sent to video encoder 224, display controller 214 (for display on display 216), or storage controller 226 for storage at persistent storage 228.

Example Image Data Processing Pipelines

Figure 3:
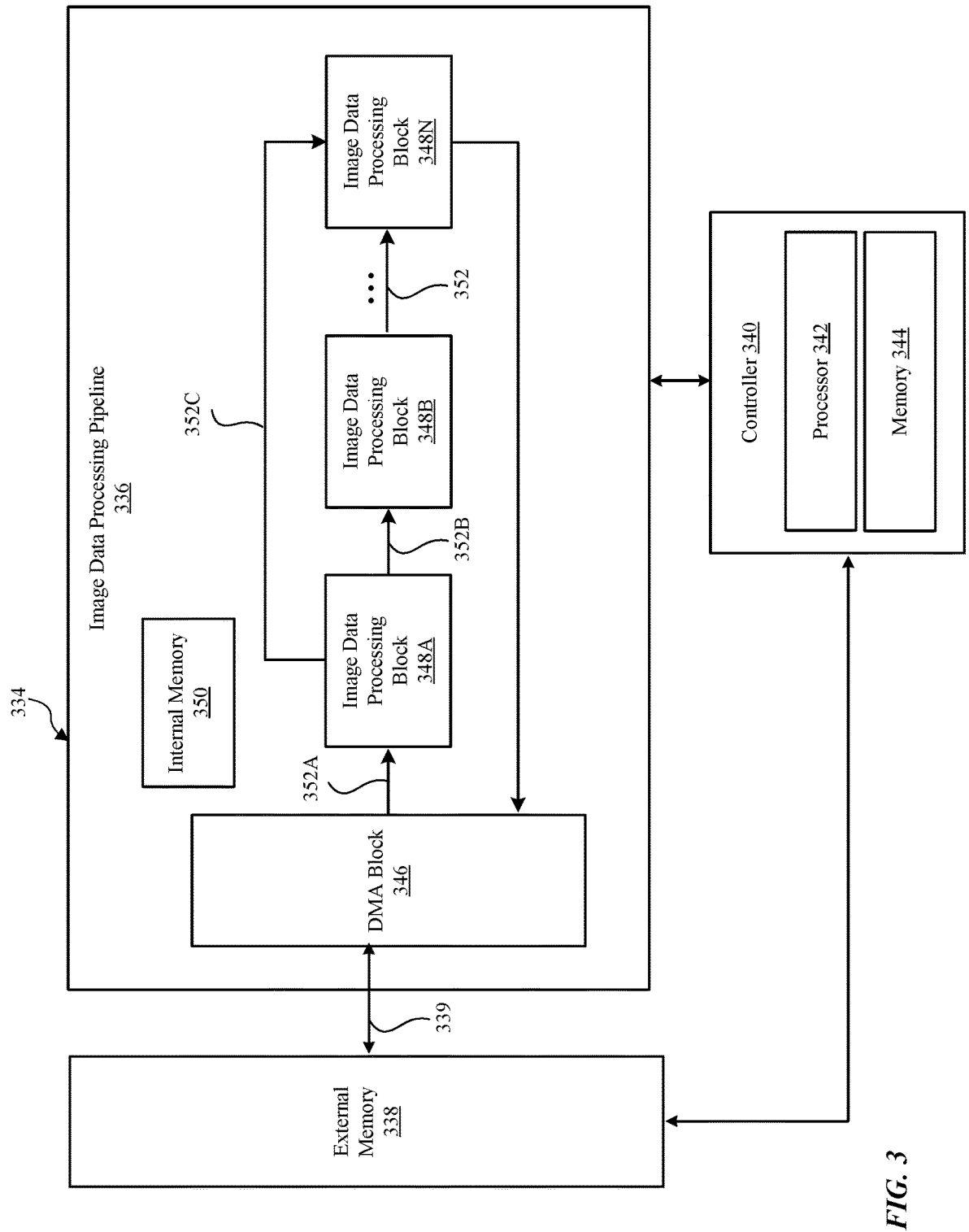
FIG. 3 is a block diagram of the image data processing pipeline and surrounding components of the electronic device of FIG. 1, according to one embodiment.

FIG. 3 is a block diagram illustrating a portion 334 of the electronic device 100 including an image data processing data pipeline 336, according to one embodiment. The image data processing pipeline 336 may be part of image signal processor 206, a display controller 214 or other components illustrated in FIG. 2.

Although a single image data processing pipeline 336 is depicted, in some embodiments, an electronic device 100 may include multiple image data processing pipelines 336. Additionally, in some embodiments, different image data processing pipelines 336 may provide at least partially differing functions. For example, image data processing pipelines 336 implemented in an electronic device 100 may include a video encoding pipeline, a video decoding pipeline, a memory-to-memory scaler/rotator (MSR) pipeline, a display pipeline, or any combination thereof.

The portion 334 of the electronic device 100 further includes external memory 338 and a controller 340. In some embodiments, the controller 340 may control operation of the image data processing pipeline 336 and/or the external memory 338. For example, the controller 340 may be a direct memory access (DMA) controller that coordinates access to external memory 338 based on indications (e.g., signals) that data is to be stored in external memory 338 and/or indications that data is to be retrieved from external memory 338.

To facilitate controlling operation, the controller 340 may include a controller processor 342 and a controller memory 344. In some embodiments, the controller processor 342 may execute instructions stored in the controller memory 344. Thus, in some embodiments, the controller processor 342 may be included in the CPU 208, the image signal processor 206, the GPU 220, a timing controller in the display 216, or any combination thereof. Additionally, in some embodiments, the controller memory 344 may be included in the system memory 230, the persistent storage 228, the external memory 338, a separate tangible, non-transitory, computer readable medium, or any combination thereof.

The image data processing pipeline 336 may be communicatively coupled to the external memory 338 via one or more communication busses 339 (e.g., DMA channels), for example, to enable the image data processing pipeline 336 to retrieve image data from the external memory 338 and/or store image data to the external memory 338. In other words, the external memory 338 may store image data, for example, to facilitate communication between image data processing pipelines 336. Thus, in some embodiments, the external memory 338 may be included in the system memory 230, the persistent storage 228, a separate tangible, non-transitory, computer readable medium, or any combination thereof.

To facilitate communication with the external memory 338, the image data processing pipeline 336 may include a direct memory access (DMA) block 346. For example, the direct memory access block 346 may retrieve (e.g., read) image data from the external memory 338 for processing by the image data processing pipeline 336. Additionally or alternatively, the direct memory access block 346 may store (e.g., write) processed image data determined by the image data processing pipeline 336 to the external memory 338. To facilitate processing image data, in some embodiments, the image data processing pipeline 337 may include internal memory 350, for example, implemented as a frame buffer or a tile buffer.

The image data processing pipeline 336 may be implemented by pipelined circuitry that operates to perform various functions used for image data processing. To simplify discussion, the functions (e.g., types of operations) provided by the image data processing pipeline 336 are divided between various image data processing blocks 348A-N (e.g., circuitry or modules and collectively referred to herein as image data processing blocks 348). For example, when the image data processing pipeline is a memory-to-memory scaler/rotator (MSR) pipeline, the image data processing blocks 348 may include a rotator block, a convert block, a scaler block, a color manager block, a revert block, a dither block, a statistics block, or any combination thereof. Additionally, when the image data processing pipeline 336 is a display pipeline, the image data processing blocks 348 may include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

To facilitate pipelining image data processing blocks 348, circuit connections 352 (e.g., wires or conductive traces) may be formed in the image data processing pipeline 336. For example, a first circuit connection 352A may couple an output of the direct memory access block 346 to an input of a first image data processing block 348A, a second circuit connection 352B may couple an output of the first image data processing block 348A to an input of a second image data processing block 348B, and so on with an Nth circuit connection 352N that communicatively couples an output of an Nth image data processing block 348N to an input of the direct memory access block 346. Additionally, a third circuit connection 352C may couple the output of the first image data processing block 348A to an input of the Nth image data processing block 348N.

In other words, one or more circuit connections 352 may be formed in the image data processing pipeline 336 to implement a data path through the image data processing pipeline 336. In fact, in some embodiments, an image data processing pipeline 336 may be implemented with multiple selectable data paths. For example, image data may be communicated from the first image data processing block 348A to the Nth image data processing block 348N via either a first (e.g., primary) data path that includes the second circuit connection 352B or a second (e.g., bypass) data path that includes the third circuit connection 352C. To facilitate selecting between multiple data paths, in some embodiments, an image data processing blocks 348 may operate to selectively output image data to a subset (e.g., one) of the circuit connections 352 coupled to its output.

As described above, various types of image data processing pipelines 336, each providing at least partially varying functions, may be provided in an electronic device 100. To improve effectiveness of the techniques disclosed herein, in some embodiments, the techniques may be tailored to different types of image data processing pipelines 336. For example, the techniques may be tailored to an image data processing pipeline 336 based at least in part on functions provided by its image data processing blocks 348.

Figure 4:
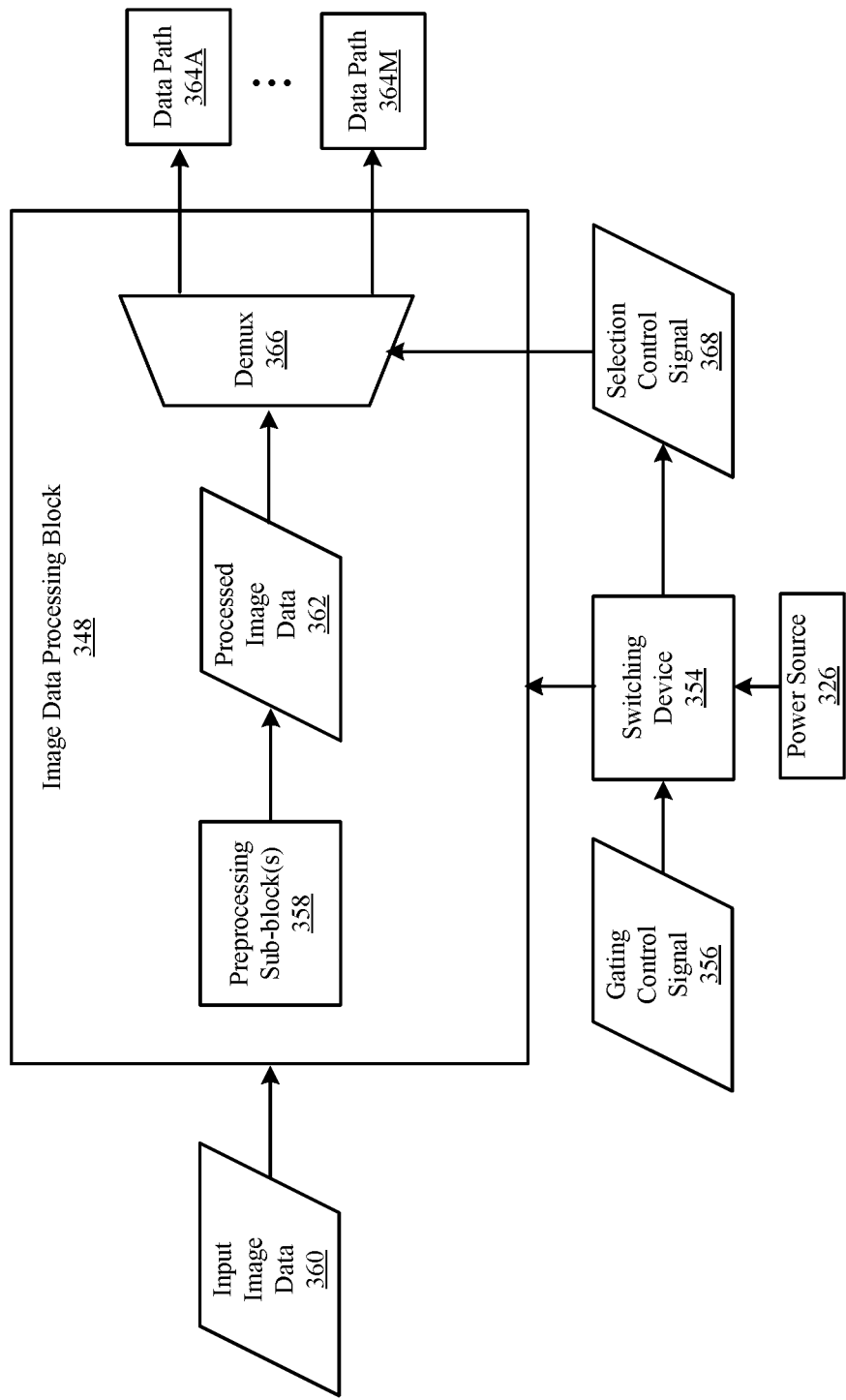
FIG. 4 is a block diagram illustrating an image data processing block in the image data processing pipeline of FIG. 3, according to one embodiment.

To help illustrate, an example of an image data processing block 348, which may be implemented in an image data processing pipeline 336, is shown in FIG. 4. The image data processing block 348 may be implemented with circuitry that operates to perform a specific function. Since implemented using circuitry, the image data processing block 348 may operate when electrical power is received from the power source 326. To facilitate controlling supply of electrical power, a switching device 354 (e.g., a mechanical switch, an electromechanical switch, or a transistor) may be electrically coupled between the power source 326 and the image data processing block 348.

In some embodiments, the switching device 354 may selectively connect and disconnect electrical power based at least in part on a gating control signal 356. For example, when the gating control signal 356 is a logic low, the switching device 354 may maintain an open position, thereby blocking supply of electrical power from the power source 326 to the image data processing block 348. On the other hand, when the gating control signal 356 is a logic high, the switching device 354 may maintain a closed position, thereby enabling supply of electrical power from the power source 326 to the image data processing block 348.

Selectively connecting and disconnecting electrical power to one or more image data processing blocks 348 in an image data processing pipeline 336 may improve power consumption efficiency. In some embodiments, electrical power may be selectively connected and disconnected based at least in part on target functions to be performed during a pass through the image data processing pipeline 336, for example, as determined by the controller 340. Thus, in some embodiments, the controller 340 may output the gating control signal 356 supplied to the switching device 354.

To perform a function when electrical power is received from the power source 326, the image data processing block 348 may include one or more processing sub-blocks 358 (e.g., image data processing circuitry) that each performs a sub-function. For example, when a rotator block, the image data process block 348 may include a first processing sub-block 358 that operates to perform a ninety degree rotation, a second processing sub-block 358 that operates to perform a one-hundred eighty degree rotation, and a third processing sub-block 358 that operates to perform a two-hundred seventy degree rotation. By processing input image data 360 using its one or more processing sub-blocks 358, the image data processing block 348 may determine processed image data 362. For example, when the image data processing block 348 is a rotator block, the processing sub-blocks 358 may rotate the input image data 360 to determine processed image data 362 (e.g., rotated image data).

After processing, the image data processing block 348 may output processed image data 362 to a circuit connection 352 included in a data path 364. In some embodiments, an output of an image data processing block 348 may be coupled to multiple circuit connections 352 each included in a different data path 364A-364M (collectively referred to herein as data path 364). For example, the output of the image data processing block 348 may be coupled to a circuit connection 352 included in a first data path 364A and a circuit connection 352 included in an Mth data path 364M. In some embodiments, the image data processing block 348 may be coupled to two data paths 364, for example, a primary data path and a bypass data path. In other embodiments, the image data processing block 348 may be coupled to more than two data paths 364.

When coupled to multiple selectable data paths 364, the image data processing block 348 may include a de-multiplexer 366 coupled between its processing sub-blocks 358 and each of the multiple data paths 364. In some embodiments, the de-multiplexer 366 may selectively output the processed image data 362 to a subset of the multiple data paths 364 based at least in part on a selection control signal 368. For example, when the selection control signal 368 is a logic low, the de-multiplexer 366 may output the processed image data 362 to the first data path 364A (e.g., primary data path). On the other hand, when the selection control signal 368 is a logic high, the de-multiplexer 366 may output the processed image data 362 to the Mth data path 364M (e.g., bypass data path).

Selectively outputting processed image data 362 to a subset of data paths 364 coupled to an image data processing block 348 may facilitate improving operational flexibility of an image data processing pipeline 336 that includes the image data processing block 348. In some embodiments, selectively outputting processed image data 362 to a subset of multiple possible data paths 364 may be based at least in part on target functions to be performed during a pass through the image data processing pipeline 336, for example, as determined by the controller 340. Thus, in some embodiments, the controller 340 may output the selection control signal 368 supplied to the de-multiplexer 366.

In any case, to improve operational flexibility and/or power consumption efficiency, one or more image data processing blocks 48 in an image data processing pipeline 336 may be implemented in accordance with the above-described techniques. For example, with regard to FIG. 4, a switching device 354 may be electrically coupled between the power source 326 and each image data processing block 348 in the image data processing pipeline 336. In this manner, supply of electrical power to the image data processing blocks 348 during passes through the image data processing pipeline 336 may be relatively (e.g., substantially) independently controlled. For example, when the first image data processing block 348A outputs processed image data 362 to the third circuit connection 352C instead of the second circuit connection 352B during a pass, a first switching device 354 may be instructed to connect electrical power to the first image data processing block 348A and a second switching device 354 may be instructed to disconnect electrical power from the second image data processing block 348B. In other words, at least in some instances, implementing in this manner may facilitate improving power consumption efficiency of the image data processing pipeline 336, for example, by enabling power consumption to be reduced when one or more of the functions provided by its image data processing blocks 348 are not targeted for performance during a pass.

Figure 5:
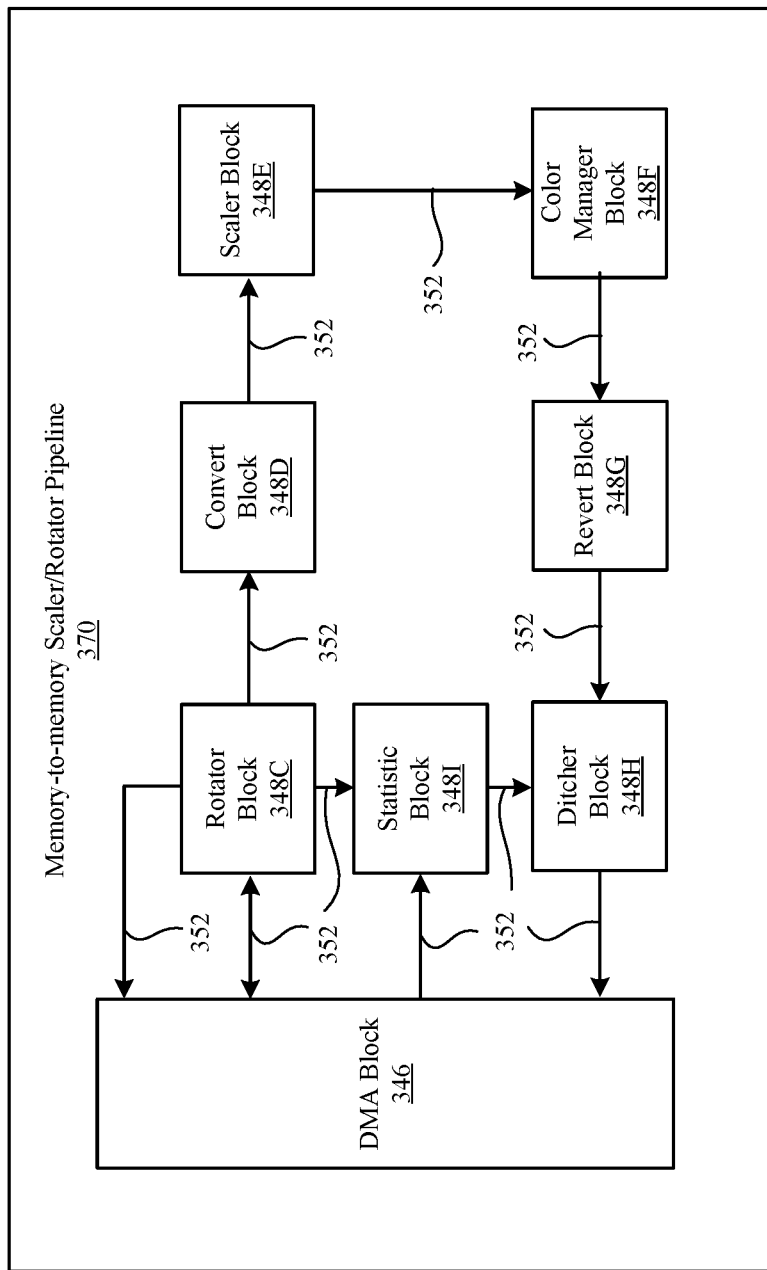
FIG. 5 is a block diagram illustrating a memory-to-memory scaler/rotator (MSR) pipeline, according to one embodiment.

To help illustrate, a first type of image data processing pipeline 336—namely a memory-to-memory scaler/rotator (MSR) pipeline 370—is shown in FIG. 5. It should be appreciated that the example image data processing pipeline 370 is merely intended to be illustrative and not limiting.

With regard to FIG. 5, the techniques disclosed herein may be implemented in the memory-to-memory scaler/rotator pipeline 370. As depicted, the image data processing blocks 348 implemented in the memory-to-memory scaler/rotator pipeline 370 includes a rotator block 348C, a convert block 348D, a scaler block 348E, a color manager block 348F, a revert block 348G, a dither block 348H, and a statistics block 348I. In some embodiments, the rotator block 348C may rotate input image data 360, the scaler block 348E may scale input image data 360, the color manager block 348F may map input image data 360 into a display panel color gamut, the dither block 348H may spatially and/or temporally dither input image data 360, and the statistics block 348I may process input image data 360 to statistics data indicative of characteristics of the input image data 360 and/or characteristics of corresponding content. Additionally, in some embodiments, the convert block 348D may convert input image data 360 from a source format (e.g., representation) to an internal format and the revert block 348G may convert input image data 360 from the internal format back to the source format.

The circuit connections 352 coupled to the image data processing blocks 348 may be formed to implement multiple selectable data paths 364 through the memory-to-memory scaler/rotator pipeline 370. For example, a primary (e.g., rotate and scale) data path 364 through the memory-to-memory scaler/rotator pipeline 368 may be implemented by the circuit connections 352 that couple an output of the direct memory access block 346 to an input of the rotator block 348C, an output of the rotator block 348C to an input of the convert block 348D, an output of the convert block 348D to an input of the scaler block 348E, an output of the scaler block 348E to an input of the color manager block 348F, an output of the color manager block 348F to an input of the revert block 348G, an output of the revert block 348G to an input of the dither block 348H, and an output of the dither block 348H to an input of the direct memory access block 346. Additionally, a first bypass (e.g., rotate only) data path 364 may be implemented by the circuit connections 352 that couple an output of the direct memory access block 346 to an input of the rotator block 348C and an output of the rotator block 348C to an input of the direct memory access block 346.

Furthermore, a second bypass (e.g., statistics only) data path 364 may be implemented by the circuit connections 352 that couple an output of the direct memory access block 346 to an input of the statistics block 348I and an output of the statistics block 348I to an input of the direct memory access block 346. Since characteristics of image data may change after processing, circuit connections 352 may additionally or alternatively be formed to include the statistics block 348I in other data paths 364 through the memory-to-memory scaler/rotator pipeline 370. For example, the primary data path 364 may be expanded to include the statistics block 348I via the circuit connections 352 that couple an output of the dither block 348H to an input of the statistics block 348I and an output of the statistics block 348I to an input of the direct memory access block 346. Additionally or alternatively, the first bypass data path 364 may be expanded to include the statistics block 348I via the circuit connections 352 that couple an output of the rotator block 348C to an input of the statistics block 348I and an output of the of the statistics block 348I to an input of the direct memory access block 346.

To improve operational flexibility, a subset of the multiple different data paths 364 may be selectively implemented during a pass through the memory-to-memory scaler/rotator pipeline 370 based at least in part on functions targeted for performance during the pass. For example, when the targeted functions for a pass include a rotate function and a scale function, the memory-to-memory scaler/rotator pipeline 370 implement the primary data path 364. To implement the primary data path 364, the rotator block 348C may be instructed to output processed image data 362 to the convert block 348D, for example, without outputting the processed image data 362 directly to the direct memory access block 346 or the statistics block 348I. Additionally, when the targeted functions for a pass include a rotate function, but not a scale function, the memory-to-memory scaler/rotator pipeline 370 may implement the first bypass data path 364, for example, by instructing the rotator block 348C to not output processed image data 362 to the convert block 348D.

Furthermore, when the targeted functions for a pass include only a statistics function, the memory-to-memory scaler/rotator pipeline 370 may implement the second bypass data path 364. To implement the second bypass data path 364, the direct memory access block 346 may be instructed to supply input image data 360 directly to the statistics block 348I, for example, without supplying the input image data 360 to the rotator block 348C. Thus, in some embodiments, a direct memory access block 346 may include a de-multiplexer 366 implemented in a similar manner as a de-multiplexer included in an image data processing block 348.

To facilitate improving power consumption efficiency, electrical power may be selectively supplied to the image data processing blocks 348 during a pass through the memory-to-memory scaler/rotator pipeline 370 based at least in part on functions targeted for performance during the pass. In other words, electrical power may be selectively supplied to each of the image data processing blocks 348 based at least in part on which of the multiple data paths 364 through the memory-to-memory scaler/rotator pipeline 370 is implemented during the pass. For example, when the primary data path 364 is implemented during a pass, electrical power may continuously be supplied to each of the image data processing blocks 348 during the pass.

On the other hand, when a bypass data path 364 is implemented during a pass, electrical power may be disconnected from one or more of the image data processing blocks 348 during the pass. For example, when the first bypass data path 364 is selected for implementation during a pass, electrical power may continuously be supplied to the rotator block 348C, for example, without supplying electrical power to the convert block 348D, the scaler block 348E, the color manager block 348F, the revert block 348G, or the dither block 348H. Additionally, when the second bypass data path 364 is selected for implementation during a pass, electrical power may continuously be supplied to the statistics block 348I, for example, without supplying electrical power to the rotator block 348C, the convert block 348D, the scaler block 348E, the color manager block 348F, the revert block 348G, or the dither block 348H. In this manner, the techniques disclosed herein may be tailored to facilitate improving operational flexibility and/or power consumption efficiency of a memory-to-memory scaler/rotator pipeline 370 and, thus, an electronic device 100 in which the memory-to-memory scaler/rotator pipeline 370 is implemented.

Example Super-resolution Engine

Figure 6:
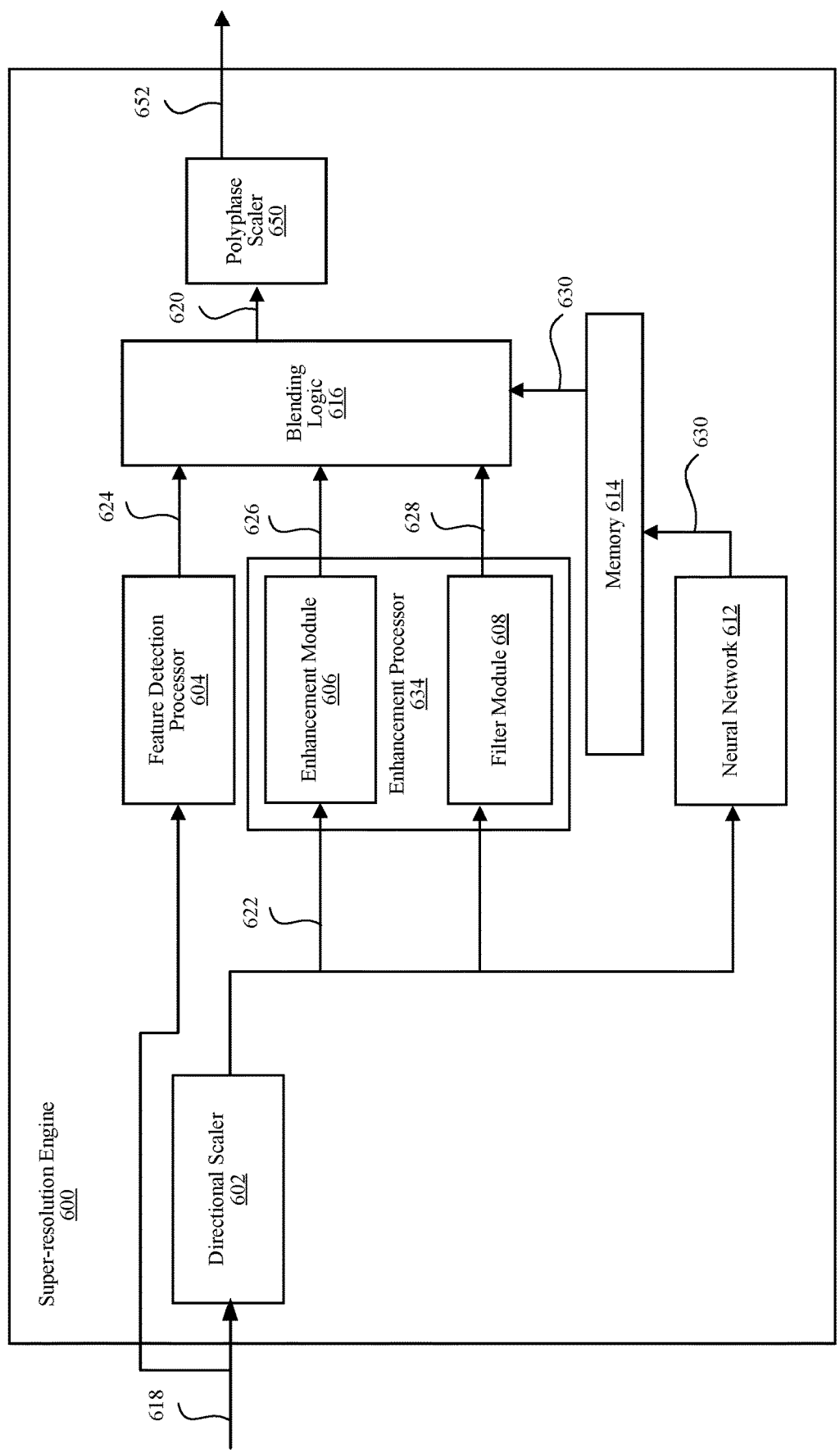
FIG. 6 is a block diagram illustrating a super-resolution engine, according to one embodiment.

FIG. 6 is a block diagram illustrating a super-resolution engine 600, according to one embodiment. The super-resolution engine 600 is a circuitry that receives input image data 618, and converts the input image data 618 into an output image data 620 having higher pixel resolution than the input image data 618. In some embodiments, the super-resolution engine 600 is a component of an image data processing pipeline, such as the scaler block 348E of the memory-to-memory scaler/rotator pipeline 370 shown in FIG. 5. The input image data 618 may be an individual image, or may be a frame of a multiple frame video. The super-resolution engine 600 uses a neural network 612 to perform the resolution enhancement, where outputs of the neural network 612 are combined with outputs of an enhancement processor 634 that do not use a neural network to generate the output image data 620.

The controller 340 may control and coordinate overall operation of other components in super-resolution engine 600. For example, the controller 340 may control the mode of operation of the super-resolution engine 600 by sending configuration information to the other components of the super-resolution engine. In some embodiments, the controller 340 performs operations including, but not limited to, monitoring various operating parameters (e.g., logging clock cycles, memory latency, quality of service, and state information), updating or managing control parameters for other components of super-resolution engine 600. For example, the controller 340 may update programmable parameters for other components in the super-resolution engine 600 while the other components are in an idle state. After updating the programmable parameters, the controller 340 may place these components of super-resolution engine 600 into a run state to perform one or more operations or tasks.

The super-resolution engine 600 may include, among other components, a directional scaler 602, a feature detection processor 604, an enhancement processor 634 including an enhancement module 606 and a filter module 608, a neural network 612, a memory 614, a blending logic circuit 616, and a polyphaser scaler 650. In some embodiments, enhancement module 606 may make enhancements to data from directional scaler 602 using examples. Further, in some embodiments, filter module 608 may be a peaking filter. The directional scaler 602 is coupled to the enhancement module 606, the filter module 608, and the neural network 612. Each of the feature detection processor 604, enhancement module 606, and filter module 608 are coupled to the blending logic circuit 616. The directional scaler 602 is further coupled to the neural network 612, which is coupled to the memory 614. The blending logic circuit 616 is further coupled to neural network 612 via the memory 614. The controller 340 may be coupled to the directional scalers 602, the feature detection processor 604, the enhancement processor 634 including the enhancement module 606 and the filter module 608, the neural network 612, and the blending logic circuit 616. The controller 340 may control data routing and configurations for the components of the super-resolution engine 600. In some embodiments, the directional scaler may be omitted from the super-resolution engine 600.

In some embodiments, the super-resolution engine 600 is implemented using the components of the electronic device 100. For example, the CPU 208 of the device 100 may execute instructions stored in the memory 230 that configure the CPU 208 to perform the functionality discussed herein for the directional scaler 602, the controller 340, the feature detection processor 604, the enhancement module 606, the filter module 608, and the blending logic circuit 616. The neural network 612 may be implemented in the GPU 220, or an application specific integrated circuit (ASIC) configured to perform neural network inferencing. In some embodiments, the neural network 612 uses a neural network model to generate residual values, with the neural network model and the residual values being stored in the memory 230. The implementation of the super-resolution engine 600 is not limited to the components of the device 100, and can be implemented on various types of suitably configured computing circuitry.

The directional scaler 602 receives the input image data 618, and generates directionally scaled image data 622 from the input image data 618. The directional scaler 602 generates the directionally scaled image data 622 for input to the enhancement processor 634 and the neural network 612. In some embodiments, the directional scaler 602 performs a factor upscaling (e.g., 2× upscaling) along edge orientations of the input image data 618 to reduce the appearance of artifacts in the output image data 620 output from the blending logic circuit 616. For example, the directional scaler 602 receives the input image data 618 in the YcbCr format, ARGB format, or some other format. When the input image data 618 is in the ARGB format, the directional scaler 602 performs a 3×1 transform on the sRGB input to form a luminance channel Y. The directional scaler 602 performs a scaling of the input image data 618 in several stages. In a first stage, the directional scaler 602 applies an (e.g., 2×) interpolation by interpolating the mid-point of every 2×2 set of pixels in the input image data 618 and by interpolating the exterior points of the 2×2 set of pixels. In a second stage, the directional scaler 602 performs a directional interpolation in either the gamma compressed domain or the linear domain. In some embodiments, the directional interpolation is performed on all sRGB color channels at full precision, and the luminance channel Y at reduced precision.

In some embodiments, the super-resolution engine 600 (e.g., the directional scaler or some other component) converts the format of the input image data 618 to facilitate super-resolution enhancement. For example, image data in the ARGB format may be converted into Y, U, or V color channels of the YcbCr format. In another example, image data in the YcbCr format is converted into channels of the ARGB format.

In some embodiments, the super-resolution engine 600 can be selectively operated in multiple modes, such as according to instructions from the controller 340. The multiple modes of operation may include a super-resolution enhancement mode and a visual enhancement mode. In the super-resolution enhancement mode, the directional scaler 602 is activated to generate the directionally scaled image data 622, while in the visual enhancement mode, the directional scaler 602 operates as a bypass and transmits the input image data 618 without performing directional scaling. In the super-resolution enhancement mode, the super-resolution engine 600 generates output image data 620 having a higher resolution than the input image data 618. In the visual enhancement mode, the super-resolution engine 600 generates output image data having the same resolution as the input image data 618, but with enhanced image quality. The discussion herein regarding the processing of the directionally scaled image data 622 by components of the super-resolution engine 600 in the super-resolution enhancement mode may also be applicable to processing of the input image data 618 in the visual enhancement mode. For example, in the visual enhancement mode, training images for the neural network 612 may include high resolution/low resolution image pairs with the high resolution image representing the desired output.

The enhancement processor 634 applies one or more non-neural network processing schemes to the directionally scaled image data 622. The enhancement processor 634 may include one or more components that apply non-neural network processing schemes. For example, the enhancement processor 634 may include the enhancement module 606 and the filter module 608. The enhanced image data 626/628 output from enhancement processor 634 are combined with residual values 630 output from the neural network 612 to generate the output image data 620. The enhancement processor 634 is not limited to the enhancement module 606 and the filter module 608, and other types of enhancement circuitries and non-neural network processing schemes may also be used to generate enhanced image data that is combined with the enhanced image data (e.g., residual values 630) output from the neural network 612. Examples of non-neural network processing schemes may include multi-frame fusion, peaking filter, example-based enhancement based on self similarity, or dictionary-based enhancement based on low-resolution/high-resolution patches.

In some embodiments, one or more components of the enhancement processor 634 may be omitted from the super-resolution engine 600, or may be selectively deactivated. For example, the filter module 608 may process the Y luminance channel when the directionally scaled image data 622 uses the YcbCr format, and may be disabled when the directionally scaled image data 622 uses the ARGB format. In another example, the enhancement module 606 may be activated in the super-resolution enhancement mode, but deactivated in the visual enhancement mode. When deactivated in the visual enhancement mode, the enhancement module 606 may receive the input image data 618 from the directional scaler 602, and may act as a bypass to transmit the input image data 618 to the blending logic circuit 616 to generate the output image data 620. Similarly, when the filter module 608 is deactivated, the filter module 608 may act as a bypass for data input to the filter module 608.

The enhancement module 606 generates example-based enhanced image data 626 using the directionally scaled image data 622. The enhancement module 606 uses example patches (or "pixel blocks," as used herein) from the lower resolution input image data 618 to derive the example-based enhanced image data 626, where the example-based enhanced image data 626 includes high resolution features in a scaled image. The enhancement module 606 receives the directionally scaled image data 622 and the input image data 618, generates the example-based enhanced image data 626 from processing the directionally scaled image data 622, and provides the example-based enhanced image data 626 to the blending logic circuit 616. The enhancement module 606 may receive the input image data 618 from the directional scaler 602, or directly from the input to the super-resolution engine 600.

To perform the example-based enhancement, for each 5×5 pixel block centered at (I, j) in the directionally scaled image data 622, the enhancement module 606 determines a set of 5×5 pixel blocks centered at (i»1, j»1) in the input image data 618, and determines low pass filtered versions of the set of pixel blocks in the input image data 618. The set of 5×5 pixel blocks correspond to the blocks with center located in a +/−2 pixel neighborhood. The 5×5 pixel block of the directionally scaled image data 622, the set of 5×5 pixel blocks of the input image data 618, and the low-pass filtered pixel blocks of the input image data 618 are used to generate the example-based enhanced image data 626. In some embodiments, each set of 5×5 pixel blocks include 25 5×5 pixel blocks. In some embodiments, the example-based enhancement can be a weighted combination of patches from a lower-resolution image (e.g., input image data 618) or the same-resolution image (e.g., the directionally scaled image data 622) where the weights are directly proportional to the similarity between patches of the lower-resolution input image and the current block of the directionally scaled image.

The filter module 608 generates peaking filter enhanced image data 628 from the directionally scaled image data 622. For directionally scaled image data 622 in the YCbCr format, the filter module 608 applies high-pass filters to the Y luminance channel to generate the peaking filter enhanced image data 628. In some embodiments, the peaking filter enhanced image data 628 includes only enhanced pixel values for the Y luminance channel, while in other embodiments the peaking filter enhanced image data 628 may include multiple (e.g., all) color channels of the directionally scaled image data 622. The filter module 608 may include a plurality of filters in the horizontal and vertical directions. For example, the filter module 608 may include a 9×1 filter, an 11×1 filter, and a 13×1 filter in the horizontal direction, and a 3×1 filter, a 5×1 filter, and a 7×1 in the vertical direction. The coefficients of each filter may be assumed to be symmetric so that only t+1 multipliers are needed for a filter with 2t+1 filter taps. The filter module 608 determines a difference between the output of the 13×1 (7×1) filter and the 11×1 (5×1) filter, and a difference between the output of the 11×1 (5×1) filter and the 9×1 (3×1) filter. The two resulting differences may be multiplied by either an adaptive gain or a programmatic gain, and the output is summed together, normalized and cored.

In some embodiments, the output of each filter is calculated based on Equation 4:

$$pOut[pos]=((pFilt[0]*pIn[pos]+\Sigma_{i=1}^{t'}pFilt[i](pIn[pos+i]+pIn[pos-i])+(1\ll 9)\gg 10 \quad (4)$$

where pIn[ ] represents the input to the filter module 608, pOut[ ] represents the output of the filter module 608, pFilt[ ] is one luma peak of the filter and represents the programmable peaking coefficients, pos represents either the horizontal or vertical pixel position depending upon whether the filter module 608 is being applied horizontally or vertically. In some embodiments, the value of t is equal to 4(1), 5(2), and 6(3) for the 9×1 (3×1) filter, 11×1 (5×1) filter, and 13×1 (7×1) filter respectively where the values in the parentheses corresponded to the vertical filter and the other values correspond to the horizontal filter. In some embodiments, the output is processed by a luminance transition improvement (LTI) to limit the overshoot and undershoots that may occur near edge transition.

In some embodiments, the filter module 608 generates the peaking filter enhanced image data 628 from the input image data 618 rather than the directionally scaled image data 622. For example, in the visual enhancement mode, the filter module 608 applies the high-pass filters to the Y luminance channel of the input image data 618.

The neural network 612 determines enhanced image data by applying a neural network image processing scheme to the directionally scaled image data 622. The enhanced image data generated by the neural network 612 may include full pixel values, or residual values. In particular, the residual values 630 define differences between target image data and the directionally scaled image data 622. In some embodiments, the residual values 630 may a difference image between a high resolution output image and the same resolution input image. The target image data refers to a desired result of super-resolution enhancement applied to the directionally scaled image data 622. The neural network 612 relates the residual values 630 as output with the directionally scaled image data 622 as input. For example, the neural network 612 may include a neural network model defining algorithmic relationships between the directionally scaled image data 622 input to the neural network 612 and the residual values 630. The neural network 612 receives the directionally scaled image data 622, generates the residual values 630 by processing the directionally scaled image data 622 using the neural network model, and provides the residual values 630 to the blending logic circuit 616. In some embodiments, the neural network 612 stores the residual values 630 in the memory 614, and the blending logic circuit 616 accesses the residual values 630 from the memory 614.

In some embodiments, the neural network 612 may generate multiple residual values 630 for a set of images or frames of video in a pre-processing step. For example, the neural network 612, or some other suitably configured neural network, may process frames of the video to determine residual values for each of the frames. The residual values for each of the frames may be stored in the memory 614, and retrieved when the frames of the video are received as input image data 618 by the directional scaler 602 for super-resolution enhancement.

In some embodiments, the neural network model of the neural network 612 is trained using training data sets including directionally scaled images as input and corresponding residual values as outputs. The training data sets may include images having features that the neural network is trained to effectively handle for super-resolution processing. Rather than learning the target image data as the output, the neural network 612 learns the residual values 630 between the target image data and the directionally scaled image data 622. In some embodiments, the neural network model is trained prior to the processing of the directionally scaled image data 622. For example, the neural network model may be trained by another neural network (e.g., belonging to a system remote from the neural network 612) using the training data sets, and then provided to the neural network 612, such as via a communication network, for use in processing the directionally scaled image data 622. In some embodiments, the residual values of the training data are determined using a training neural network having a neural network model defining algorithmic relationships between the directionally scaled image data and the target image data as inputs, and the residual values as outputs. The training neural network may be trained using training data sets including target image data and directionally scaled image data as inputs, and expected residual values between the target image data and the directionally scaled image data as outputs.

The memory 614 stores the residual values 630 generated by the neural network 612. In some embodiments, the memory 614 is a dynamic random-access memory (DRAM), although other types of data storage devices may also be used. The residual values 630 may be stored in the memory 614 at a much lower cost than storing image data (e.g., the target image data) because the compressed footprint of the residual values 630 is smaller than the entire sequence of pixel values in the image data. For example, the residual values 630 may include only pixel values that correspond with pixels of the target image data and the directionally scaled image data 622 that are different, or differ by a threshold amount. Other types of image compression algorithms may also be used to compress the residual values 630. For example, when the residual values 630 are residual values for multiple frames, then corresponding pixels across consecutive frames may be stored as a single pixel value with an identifier of the frames to which the pixel value pertains. In some embodiments, the output of the enhancement processor 634 includes residual values defined between enhanced image data 626/628 and the input directionally scaled image data 622 (or input image data 618 when scaler 602 operates as a bypass).

The feature detection processor 604 determines features 624 from the directionally scaled image data 622, and provides the features 624 to the blending logic circuit 616. A feature, as used herein, refers to one or more properties of object captured in the image data. Some examples of features may include properties that define skin, sky, grass, textures, strong edges, text, etc. The feature detection processor 604 may identify different portions of the directionally scaled image data 622 as including different features. For example, the features may indicate strong edges, skin tones, or sky/grass portions, and the blending logic circuit 616 ma blend more or less from the residual values 630 of the neural network 612 in each of the cases. The mode of blend may be a configurable parameter. For example, the blending logic circuit 616 may blend more neural network input for skin tone areas and less for non-skin-tone areas. In some embodiments, the features 624 may include texture statistics that identify higher and lower frequency portions of the directionally scaled image data 622 using an edge detection algorithm. The higher frequency portions of the directionally scaled image data 622 may corresponding with edge pixel regions, and the lower frequency portions of the directionally scaled image data 622 may correspond with surface pixel regions or other non-edge pixel regions of the directionally scaled image data 622. The features 624 may be used by the blending logic circuit 616 to determine how to blend the residual values 630 with the enhanced image data (e.g., including the example-based enhanced image data 626 from the enhancement module 606 and the peaking filter enhanced image data 628 from the filter module 608) for an optimized super-resolution enhancement. Neural networks are effective at resolution enhancement for features that it is trained upon. A disadvantage of neural networks is that it will do poorly for corner case images (e.g., including untrained features). As a result, the neural network 612 may be trained for various types of features and the feature detection processor 604 determines portions of the input image including such features to control the blending of the enhanced image data 626/628 from the enhancement processor 634 with the residual values 630.

In some embodiments, the features 624 define a segmentation of image data (e.g., into features such as background, foreground), and the weightings used for blending are adjusted based on the location of the pixel with respect to the segmentation.

The super-resolution engine 600 combines non-neural network image processing schemes (e.g., using the enhancement module 606 and/or the filter module 608) with the neural network 612 to avoid the draw-backs involved in using neural networks alone. In particular, the residual values 630 may be weighted more heavily for portions of the input image data 618 where super-resolution enhancement is more effective using the neural network 612 (e.g., portions including features that the neural network 612 has been trained to handle), while the enhanced image data 626/628 may be weighted more heavily in other portions of the output image data 620 where the non-neural network enhancement is more effective (e.g., portions including features that the neural network 612 has not been trained or is insufficiently trained to handle). In some embodiments, the neural network 612 is more effective for low frequency portions of the directionally scaled image data 622, while the non-neural network enhancement is more effective for higher frequency portions of the directionally scaled image data 622. The low and high frequency portions of the directionally scaled image data 622 may be defined by the features 624. In some embodiments, a residual value 630 from the neural network 612 may receive a weighting of 0 such that only the corresponding pixel values of the enhanced image data of the non-neural network image processing schemes contribute to a portion of the output image data 620.

Among other things, the neural network 612 does not need to be retrained when ineffective for different types of directionally scaled image data 622, and the occurrence of artifacts in the output image data 620 is reduced. Furthermore, because the neural network 612 calculates the residual values 630 rather than the target output image data, the processing requirements of the neural network 612 are reduced.

The blending logic circuit 616 generates the output image data 620 by blending the enhanced image data (e.g., residual values 630) from the neural network 612 with the enhanced image data from the enhancement processor 634, such as the example-based enhanced image data 626 from the enhancement module 606 and the peaking filter enhanced image data 628 from the filter module 608. In some embodiments, the blending logic circuit 616 applies weights to the pixel values in the enhanced image data 626, 628 and the residual values 630 according to the features 624 from the feature detection processor 604 to generate the output image data 620. For example, the residual values 630 may receive a higher weighting for portions including trained features than in other portions including untrained features. Similarly, the enhanced image data may receive a higher weighting for untrained features of the neural network, and a lower weighting for trained features of the neural network. As a result, the non-neural network super-resolution enhancements are used more in the portions of the input image data 618 including features less familiar to the neural network 612, while residual-based neural network super-resolution enhancements are used more in the portions of input image data 617 including features more familiar to the neural network 612. The enhanced image data 626/628 and the residual values 630 may be combined in various other ways.

The polyphase scaler 650 is coupled to the blending logic 616, and receives the output image data 620 from the blending logic 616. The polyphaser scaler 650 scales the output image data 620 to other resolutions, such as any fractional resolution, and outputs the scaled result as output image data 652. In some embodiments, the polyphaser scaler 650 may be omitted from the super-resolution engine 600.

Figure 7:
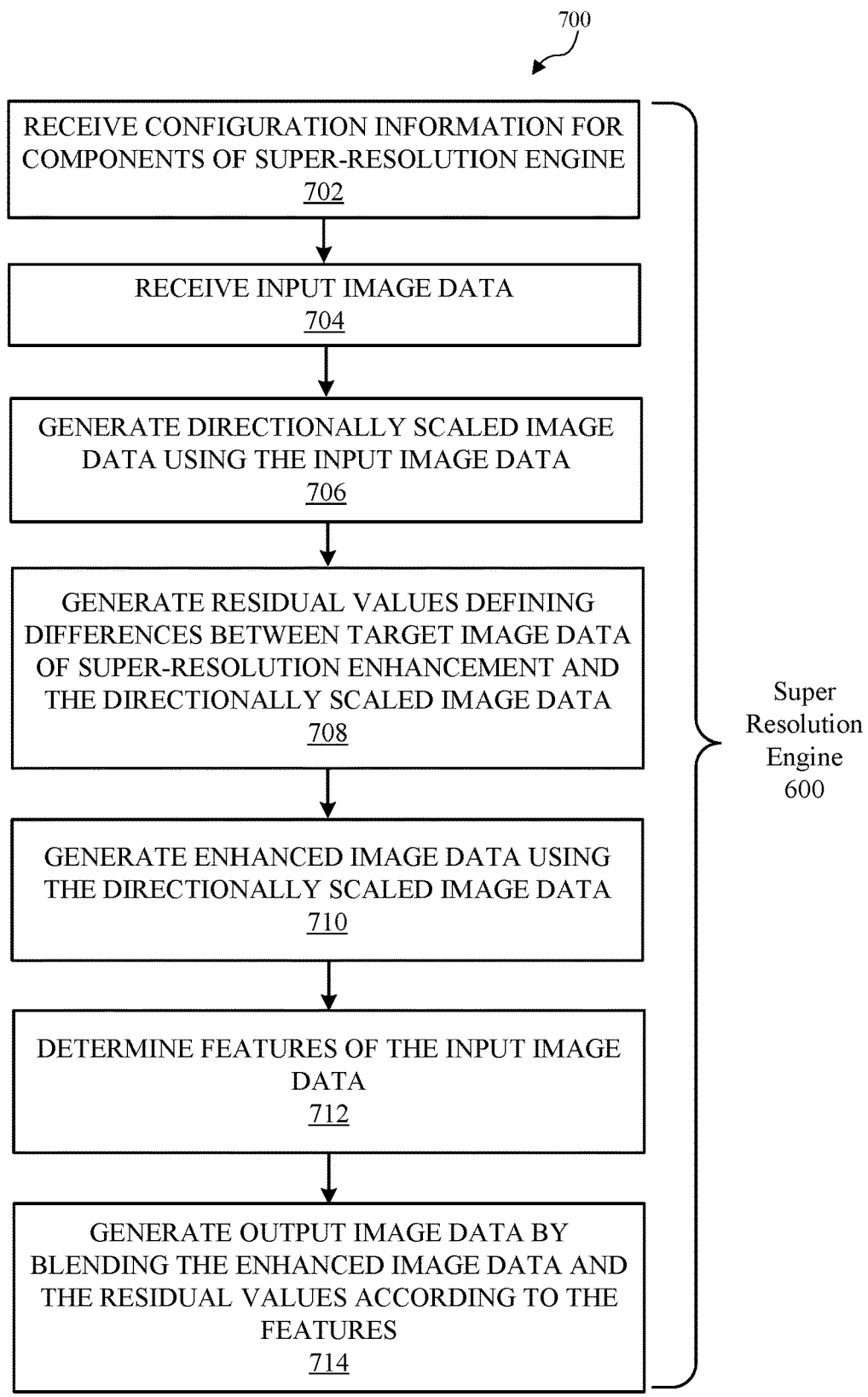
FIG. 7 is a flow chart illustrating a process of operating the super-resolution engine to generate output image data, according to one embodiment.

FIG. 7 is a flow chart illustrating a process 700 of operating the super-resolution engine 600 to generate output image data, according to one embodiment. In particular, the super-resolution engine 600 operates in the super-resolution enhancement mode to generate the output image data of an output image at a higher resolution than input image data of an input image. In one embodiment, the process 700 is performed by the electronic device 100. Other entities may perform some or all of the steps of the process in other embodiments. Likewise, embodiments may include different and/or additional steps, or perform the steps in different orders.

The super-resolution engine 600 receives 702 configuration information for the components of the super-resolution engine 600. The controller 340 may provide the configuration to each of the other components. The configuration information may include parameters for the components of the super-resolution engine 600 that place the super-resolution engine 600 in a particular mode of operation, such as the super-resolution enhancement mode or visual enhancement mode. In the process 700, the configuration information sets the super-resolution engine 600 in the super-resolution enhancement mode.

The super-resolution engine 600 receives 704 input image data 618. For example, the directional scaler 602 receives the input image data 618. The input image data 618 may be an individual image or a frame of a video. The process 700 may be repeated for each frame to provide a super-resolution enhancement to each of the frames.

The super-resolution engine 600 generates 706 directionally scaled image data 622 using the input image data 618. The directional scaler 602 of the super-resolution engine 600 performs an upscaling on the input image data 618 at a first resolution to generate the directionally scaled image data 622 at a second resolution that is higher than the first resolution. To generate the directionally scaled image data 622, the directional scaler 602 performs an (e.g., 2×) interpolation by interpolating the mid-point of every 2×2 set of pixels in the input image data 618 and by interpolating the exterior points of the 2×2 set of pixels, and further performs a directional interpolation on the input image data.

The super-resolution engine 600 generates 708 residual values 630 defining differences between target image data of super-resolution enhancement and the directionally scaled image data 622. The target image data refers to an expected or desired an output of the super-resolution enhancement of the directionally scaled image data 622. The neural network 612 of the super-resolution engine 600 receives the directionally scaled image data 622, and processes the directionally scaled image data using a neural network model to generate the residual values 630. In some embodiments, the neural network 612 stores the residual values 630 in the memory 614 of the super-resolution engine 600 for access by the blending logic circuit 616. In other embodiments, the neural network 612 sends the residual values to the blending logic circuit 616. In some embodiments, the neural network 612 generates enhanced image data that includes pixel values rather than the residual values.

The super-resolution engine 600 generates 710 enhanced image data 626/628 using the directionally scaled image data 622. As discussed above in connection with FIG. 6, the enhancement processor 634 may include one or more components that generate different types of enhanced image data. Furthermore, the enhanced image data is generated using a non-neural network image processing scheme, such as an example-based enhancement or a peaking filter. In some embodiments, the enhancement module 606 generates the example-based enhanced image data 626, and the filter module 608 generates the peaking filter enhanced image data 628. In some embodiments, the enhancement processor 634 may include one or more other components, with each component generating a different type of non-neural network enhanced image data.

The super-resolution engine 600 determines 712 features 624 using the input image data 618. As discussed above, a feature refers to a property of an object captured in the image data. Thus, the features 624 may define different objects in the image data such as skin, sky, grass, textures, strong edges, text, etc., and/or their properties. In some embodiments, the features 624 indicate one or more properties of portions of the input image data 618. In some embodiments, the properties may include one or more of (i) a distance of the portion is to an edge, (ii) a frequency region to which the portion belongs, and (iii) which one of multiple segments of the input image data 618 the portion belongs. Each of the multiple segments may share a common characteristic, such as a particular texture, frequency, or frequency range. In some embodiments, the multiple segments include segments indicating a foreground object and other segments indicating a background of the foreground object. The features 624 may further indicate the low and high frequency portions of the input image data 618. The high frequency portions correspond with edge pixel regions of the input image data 618, while the low frequency portions correspond with surface pixel regions or other non-edge pixel regions in the input image data 618.

The super-resolution engine 600 generates 714 the output image data 620 by blending the enhanced image data and the residual values 630 according to the features 624. The blending logic circuit 616 receives the enhanced image data (e.g., including the example-based enhanced image data 626 and the peaking filter enhanced image data 628) from the enhancement processor 634, and the residual values 630 from the memory 614 or directly from the neural network 612. Each instance of the enhanced image data 626/628 may include pixel values of an image at the high resolution of the directionally scaled image data 622. The residual values 630 define differences between the target image data and the directionally scaled image data 622, and in some embodiments, may include smaller data size because pixel values that are the same across corresponding pixels of the target image data and the directionally scaled image data 622 can be omitted from the residual values 630. The blending logic circuit 612 blends corresponding pixel values of the enhanced image data 626/628 and the enhanced image data of the neural network (e.g., residual values 630) according to the features 624. As discussed above, different portions of the input image data 618 may be identified as different features. For each pixel, the blending logic circuit 612 may weight each of the enhanced image data 626 or 628 and the residual values 630 according to whether the pixel corresponds with features that the neural network 612 can effectively handle (e.g., via training) or features that the neural network 612 is not trained or insufficiently trained to handle. The blending may be a soft blend where the blend weight is determined based off of the relevant feature. Portions that are confidently identified as a feature that the neural network 612 is effective at handling may result in larger weighting of the residual values 630 from the neural network 612 in the blending.

In some embodiments, the residual values 630 may receive a higher weighting for pixels in a low frequency potion, while the enhanced image data 626 or 628 may receive a higher weighting for pixels in a high frequency portion. In some embodiments, the residual values 630 are blended only with for pixels corresponding with the low frequency portions of the directionally scaled image data 622. In another example, the residual values 630 and enhanced image data 626 or 628 may receive different weightings for pixels in a background segment or feature and a foreground segment or feature. As such, the properties defined by the features 624 for each portion of an input image may be used by the blending logic circuit 616 to generate the output image data 620 by at least blending, for each portion and according to the features 624, enhanced image data generated using a non-neural network image processing scheme with enhanced image data generated using a neural network.

The process 700 may be repeated, such as for each frame of a video, or for some other group of images. For example, the blending logic circuit 616 may combine enhanced image data of each frame of a video with corresponding residual values for each frame. The blending logic circuit 616 uses the residual values with features and enhanced image data of the frame to provide super-resolution enhancement for real-time applications, such as video playback. The residual values may be computed by the neural network 612 in real-time, or the residual values for frames of the video may be pre-computed and provided to the memory 614 for retrieval by the blending logic circuit 616 as the blending logic circuit 616 provides super-resolution enhancement to each frame.

As discussed above, in some embodiments, the super-resolution engine 600 may operate in a visual enhancement mode. Here, the directional scaler 602 and the enhancement module 606 may operate in bypass mode or be deactivated, while the other components of the super-resolution engine 600 (e.g., including the feature detection processor 604, filter module 608, or neural network 612) may perform the process 700 using the input image data 618 as discussed herein for the directionally scaled image data 622.

The invention claimed is:

1. An image signal processor, comprising:
   a processor configured to analyze an input image to identify image data of a portion of the input image for resolution enhancement, the portion of the input image having a first resolution; and
   a neural network model stored in a memory, the neural network model trained to handle resolution enhancement by using training data that include pairs of directionally scaled versions of low resolution images and residual values representing differences between the directionally scaled versions of the low resolution images and corresponding high resolution images, wherein the neural network model is in communication with the processor and is configured to receive the identified image data and to output an enhanced image portion that has a second resolution higher than the first resolution.

2. The image signal processor of claim 1, further comprising:
   a blending logic circuit in communication with the neural network model and configured to generate an output image by combining the enhanced image portion with the input image.

3. The image signal processor of claim 1, wherein the neural network model is configured to output a residual value.

4. The image signal processor of claim 1, wherein the processor is configured to identify the image data for the portion of the input image by detecting a feature that the neural network model is trained to handle.

5. The image signal processor of claim 4, wherein the feature defines a surface of an object.

6. The image signal processor of claim 4, wherein the feature defines a texture of an object.

7. The image signal processor of claim 4, wherein the feature defines a skin tone.

8. A method for enhancing an input image, comprising:
   analyzing an input image to identify image data of a portion of the input image for resolution enhancement, the portion of the input image having a first resolution;
   receiving the identified image data by a neural network model that is trained to handle resolution enhancement by using training data that include pairs of directionally scaled versions of low resolution images and residual values representing differences between the directionally scaled versions of the low resolution images and corresponding high resolution images; and
   outputting an enhanced image portion that has a second resolution higher than the first resolution.

9. The method of claim 8, further comprising:
   generating an output image by combining the enhanced image portion with the input image.

10. The method of claim 8, wherein the neural network model is configured to output a residual value.

11. The method of claim 8, wherein identifying the image data for the portion of the input image comprises detecting a feature that the neural network model is trained to handle.

12. The method of claim 11, wherein the feature defines a surface of an object.

13. The method of claim 11, wherein the feature defines a texture of an object.

14. The method of claim 11, wherein the feature defines a skin tone.

15. A computing device, comprising:
    a sensor configured to capture an input image;
    a processor configured to analyze the input image to identify image data of a portion of the input image for resolution enhancement, the portion of the input image having a first resolution; and
    a memory configured to store a neural network model, the neural network model trained to handle resolution enhancement by using training data that include pairs of directionally scaled versions of low resolution images and residual values representing differences between the directionally scaled versions of the low resolution images and corresponding high resolution images, wherein the neural network model is in communication with the processor and is configured to receive the identified image data and to output an enhanced image portion that has a second resolution higher than the first resolution.

16. The computing device of claim 15, further comprising:
    a blending logic circuit in communication with the neural network model and configured to generate an output image by combining the enhanced image portion with the input image.

17. The computing device of claim 15, wherein the neural network model is configured to output a residual value.

* * * * *